March 24, 1964 I. R. BEYER 3,125,844
POWER OPERATED GRASS RAKER
Filed Oct. 30, 1961 2 Sheets-Sheet 1
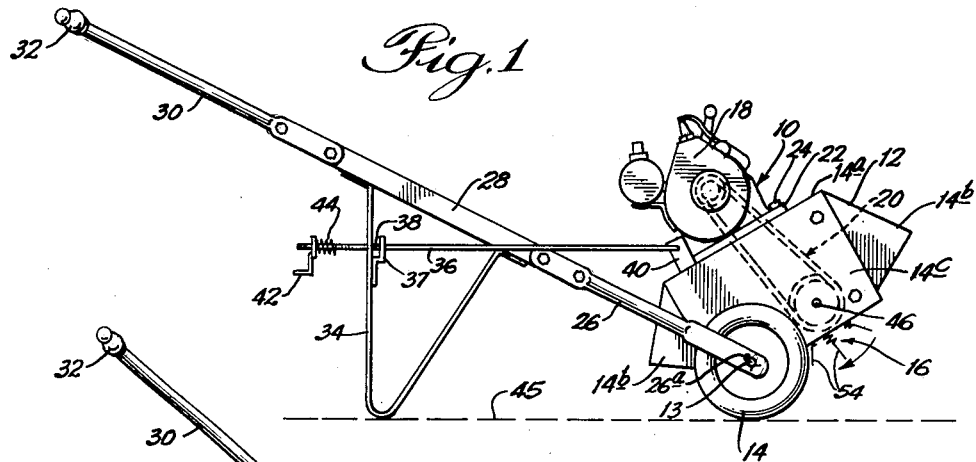
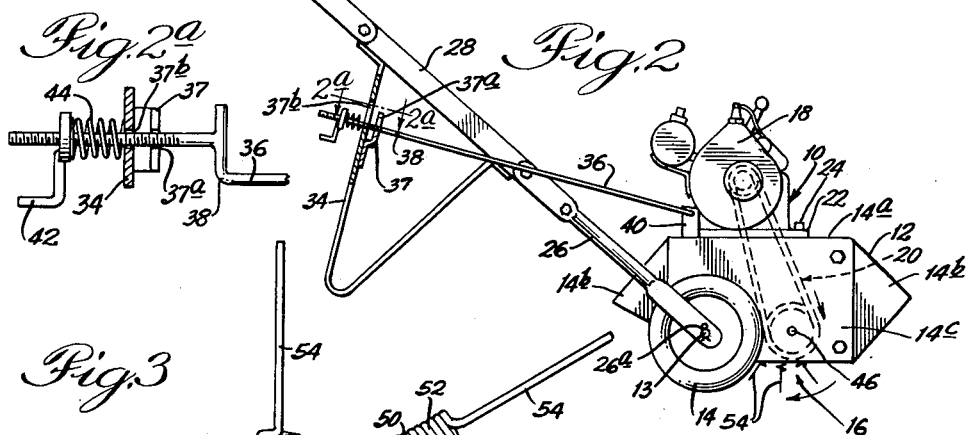
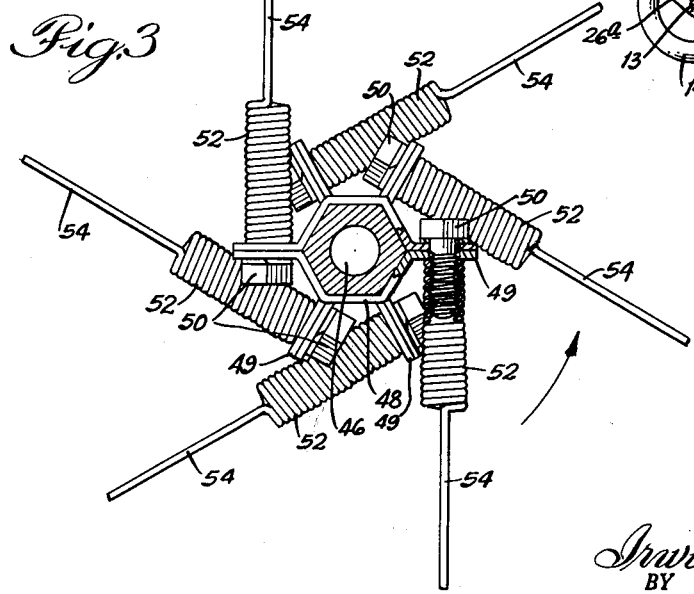
INVENTOR:
Irwin R. Beyer,
BY
Bair, Freeman and Molinare
ATTORNEYS.

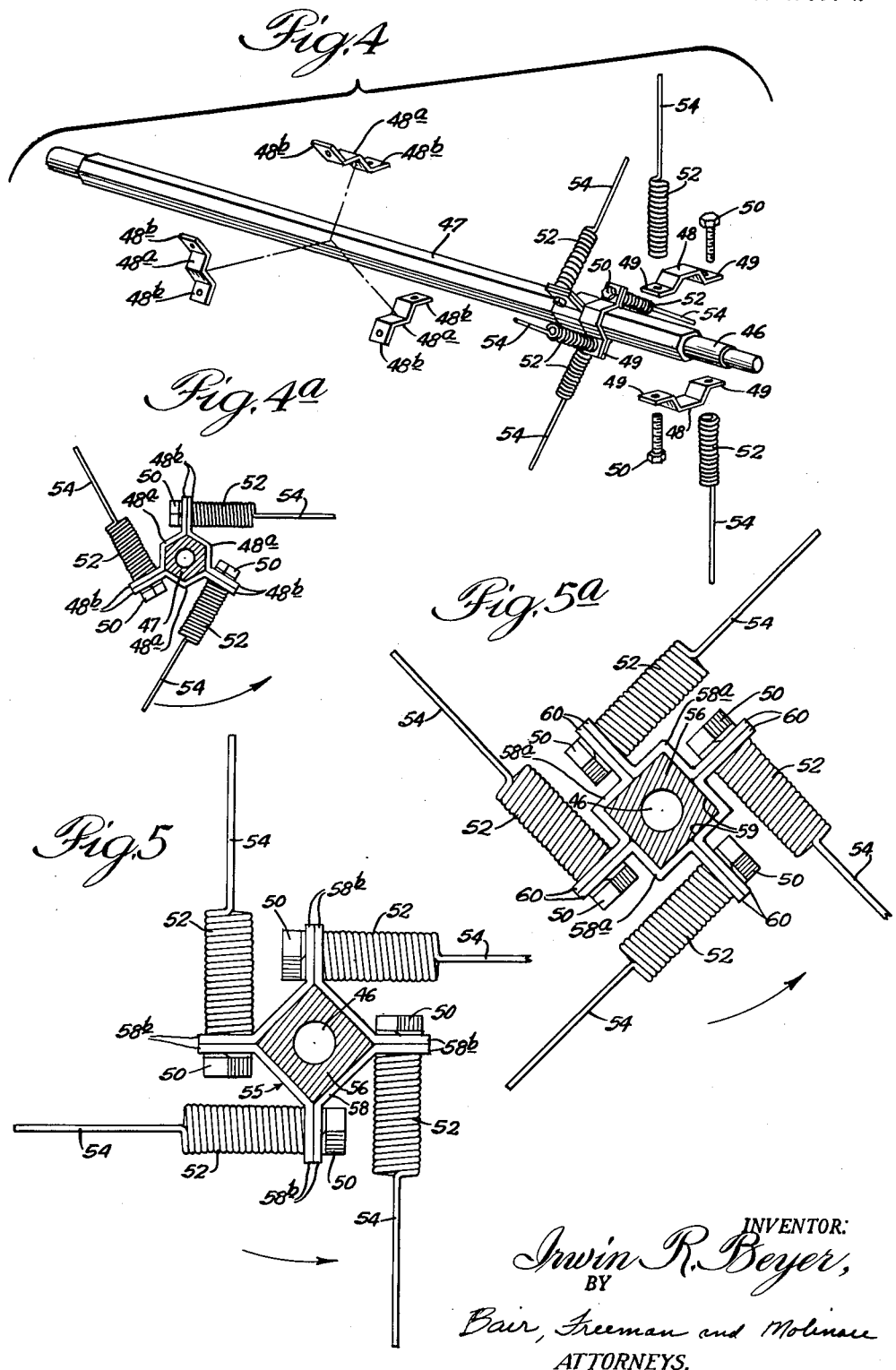

United States Patent Office 3,125,844
Patented Mar. 24, 1964

3,125,844
POWER OPERATED GRASS RAKER
Irwin R. Beyer, 537 Nelson Ave., Morton, Ill.
Filed Oct. 30, 1961, Ser. No. 148,347
7 Claims. (Cl. 56—27)

This invention relates in general to power operated grass rakers, and more particularly to a maneuverable grass raker using low power and having improved grass raking charcteristics and in which the danger of injury either to personnel or portions of the raker on encountering foreign objects is lessened.

Adequate grass raking is, of course, the primary objective of all power operated grass raking equipment, but this is not easily achieved since a large number of variables are involved. Thus, the raking is usually done by a series of spring fingers or tines spaced about a shaft and their effectiveness depends on a number of factors including the degree and angle of engagement between the fingers and grass together with the spacing and rotational speed of the fingers.

Usually, the fingers are mounted by means of tapped holes in spaced-apart positions about the shaft. Since it is commonly supposed that the raking effectiveness is directly related to the number of fingers about the shaft periphery in any one sector, the shafts are usually made large enough to accommodate a large number of holes and fingers along the shaft periphery in any one shaft sector. The length of the fingers is limited for a number of reasons, and the result is that little grass engaging area is provided between shaft and the finger ends with a larger shaft. While this presents one problem, there also exists the need to space the fingers properly both about the shaft and in adjacent shaft sectors in order to render the raking effective while at the same time avoiding excessive grass uprooting.

Another acute problem in power operated raking devices is the danger resulting from encountering obstacles or foreign objects, such as stones, rocks or pieces of metal in the lawn. These may have the result of either breaking the components or being tossed into the air, with resultant injury to anyone located in the vicinity. This problem has been especially acute in power operated lawn rakes in which the extended finger or tine assumes an angle largely parallel with the earth's plane at time of maximum raking engagement. Under this circumstance, the main force generated on encountering any obstacle is applied against the longitudinal axis of the finger for shearing, breaking or buckling the finger with respect to its support, or, in turn, tossing the obstacle.

To date, the common concept is to space the fingers as closely as possible both about the shaft, and along the shaft, leaving little room for the grass to deflect before becoming wrapped upon the fingers. When wrapped upon the fingers, it is often lifted from the lawn, resulting in considerable damage to the lawn and an unnecessarily large amount of power is required to drive the rake under these conditions. The need for larger amounts of power in turn requires that a comparatively large motor and support therefor be provided with a resultant increase in weight. The gamut of problems is not complete, however, without mention of the need for maneuverability and adjustability in order to accommodate the rake to numerous different situations.

One of the important objects of the present invention, therefore, is the provision of a shaft for a power operated lawn raker on which the raking fingers may be carried in spaced-apart positions for maximum grass engagement with mininum danger of grass being enwrapped upon the fingers and uprooted. This is achieved by the provision of a shaft having flat faces and separate brackets each having a flat face adapted to engage a similar face on the shaft to prevent rotation therebetween while the raking fingers are mounted at the junctures of respective pairs of brackets. Thus, the number of fingers about any single shaft sector may be carefully controlled to insure that one finger has completed a desired degree of lawn engagement before the next finger engages. A shaft of small diameter may therefore be used and a comparatively large proportion of the finger is available to engage the lawn. In addition, the angular position of the fingers on adjacent shaft sectors or peripheries may be adjusted with respect to each other so that fingers in adjacent sectors do not engage the grass simultaneously. Thus, maximum raking coverage and minimum grass uprooting results.

The raking fingers are constructed of spring material, as already mentioned, and they each terminate in a coil from which the fingers project parallel to the longitudinal axis of the coil. Advantage is taken of the coil by utilizing it as a nut to fasten the bracket and fingers into desired positions, thereby simplifying the assembly and construction of the rake, while in addition, the choice of the direction of the finger projection cause them to be engaged with the grass at an angle substantially perpendicular to the plane of the earth. The fingers therefore, strike any object in the lawn at an angle transverse to the longitudinal axis of the finger. This enables the spring finger to yield easily before the applied force, thereby minimizing the problem of tossed objects, broken components and uprooted grass.

The spring fingers are all carried on a common shaft which is rotated in the direction of desired movement so that the raker moves along on its wheels under its own power. By mounting the spring finger carrying the shaft on one side of the axis of rotation of the wheels, it is possible to use the rake handle as a counterbalance and by adjusting the relative position of the handle and the other raking components, any desired balance situation can be achieved. This makes possible the support of the rake on a single pair of wheels, thereby eliminating much cumbersome equipment and improving the maneuverability of the device. Further, this permits the raking fingers to be dipped into greater or lesser engagement with the grass and permits facile control of the forward movement.

It is therefore, another important object of this invention to provide an improved lawn raker of a power operated type which utilizes spring-type fingers for raking and which is adapted to be facilely used, shipped, assembled and supported.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a side elevational view of the assembled grass raker in an earth supported position;

FIGURE 2 illustrates the grass raker in an operable grass raking position;

FIGURE 2a is an enlarged sectional view taken along the line 2a—2a in FIGURE 2;

FIGURE 3 shows the raker assembly in cross-section on an enlarged scale to illustrate the distribution of the fingers about the shaft periphery;

FIGURE 4 is an exploded view of a portion of the raker assembly illustrating several different bracket types;

FIGURE 4a illustrates the manner in which one of the bracket types shown in FIGURE 4 is assembled;

FIGURE 5 is an enlarged view of a bracket arrangement for a square shaft, the bracket ears being connected at the corners of the square shaft; and FIGURE 5a is an enlarged view similar to FIGURE 5 illustrating a bracket arrangement wherein the bracket ears are connected intermediate the sides of the square shaft.

In FIGURE 1, a power operated lawn raking assembly or apparatus is indicated by the reference character 10. It comprises a housing 12 supported on a shaft 13. The shaft 13 is journalled in the housing and it has wheels 14 for supporting both the shaft and housing. The housing 12 has a top wall 14a, side walls 14b and end walls 14c between which a raker assembly 16 is carried. A power assembly 18 is mounted on the top of the housing 12 and is arranged to operate the raking assembly 16 by means of a sprocket and chain drive assembly 20. The power assembly 18 may comprise the usual gas operated motor or any other convenient power apparatus. It is assembled to the housing 12 by means of a suitable bracket 22 and bolts 24.

A yoke element 26 is pivotally mounted adjacent the ends of shaft 13 and held in position by cotter pins 26a outside of wheels 14. This permits quick and facile disassembly of the yoke from the shaft 13. The yoke element 26 has extending therefrom a series of tandem collapsible or separable handle sections or extensions 28 and 30 terminating in a handle 32. The collapsible or separable sections 28 and 30 are also arranged to permit facile assembly and disassembly of the rake 10 so that it may be easily stored and shipped.

A V-shaped arm or bracket 34 is suspended from section 28 and it supports one end of a balance arm 36. The balance arm 36 has a threaded end and it is supported adjacent that end in an arm 37 having a notch 37a for receiving the arm 36 and in an elongate hole 37b in the bracket 34. The arm 36 has an offset portion 38 which passes to one side of the yoke 26 so that the other end of arm 36 can engage a bracket 40 carried on housing 12. The arm 37 may be welded or otherwise fastened to bracket 34.

The threaded end of arm 36 engages a crank arm 42 and a heavy spring 44 positioned between the crank 42 and bracket 34. Thus, operating the crank 42 threads the arm 36 therethrough to cause the housing 12 to be tilted at a desired angle with respect to yoke 26. It will also be noted that release of handle 32 allows bracket 34 to drop until it abuts the plane of the earth 45. This leaves handle 32 in an easily accessible position while the rake is supported in the proper position upon the earth, whenever released.

The raker assembly 16 comprises a shaft 46 journalled in housing 12. The shaft 46 has a longitudinal hexahedron or hexagonal formation 47 thereon as seen in FIGURES 3 and 4. The hexagonal formation 47 is adapted to be engaged in adjacent sectors or peripheries by pairs of opposed semi-hexagonally shaped brackets or clamps 48 whose flat faces mate with corresponding faces of the formation 47. Each clamp 48 is provided with an apertured ear or flange 49 on opposite ends so that mating pairs of brackets 48 when engaged about hexahedron 47 may be fastened in position by a respective pair of screws 50, and a respective tightly coiled wire spring 52 acting as a nut. The nature of the coiling is important in securing the desired function. Each spring 52 has a raking finger or tine 54 extending in a direction substantially parallel to the longitudinal axis of the spring 52.

It will be noted that the screws 50 are inserted through the ears 49 of each bracket pair in opposite directions. Therefore, when springs 52 are assembled on the screws, fingers 54 project in opposite directions. It will also be noted that adjacent pairs of bracket 48 are positioned so that the fingers 54 of each pair are displaced 60° so that no two fingers sweep adjacent grass sectors, while each sector is swept or raked only twice for each rotation of shaft 46. It will be appreciated that this arrangement permits excellent raking coverage without excessive rotational speed while grass uprooting is held to a minimum since only every third spaced-apart grass strip or sector will be simultaneously engaged by fingers 54 at any chosen moment.

Another type of bracket 48a is illustrated in FIGURES 4 and 4a for use with the hexahedron 47. Brackets 48a are provided with only two flat faces so that three brackets are assembled to complete the encirclement of the hexahedron 47. The brackets 48a are also provided with apertured ears 48b and a spring finger is positioned at each juncture of the apertured ears as explained for bracket 48. Thus, in this case, a total of three fingers 54 are located in spaced-apart positions of 120° on each shaft sector. By adjusting the relative position of the brackets 48a in adjacent sectors of the shaft the adjacent grass sectors are swept in sequence by fingers spaced 60° apart and with every alternate sector swept simultaneously.

A modification 55 of the raker assembly 16 is shown in FIGURES 5 and 5a. This modification is used in special situations and shows a diamond or square formation 56 on the shaft 46 in place of the hexagonal formation 47. In this case, two different types of brackets 58 and 58a may be used in alternate sectors or positions along the shaft.

Thus, the brackets 58 are each provided with one flat face adapted to engage one face of formation 56. The brackets are provided with apertured ears 58b whose junctures are located at the corners of the formation 56. The spring fingers 54 are assembled thereto as previously explained and one projects from each corner to cause the corresponding grass sector to be engaged four times during each rotation of the shaft 46.

The brackets 58a, however, are provided with a pair of perpendicular flat faces 59 that engage only one-half of a corresponding face of formation 56. The brackets 58a are provided with apertured ears 60 which meet in the center of each face. The fingers 54 are assembled at the junctures of brackets 58a as explained and therefore lie 90° apart but only 45° from the fingers 54 carried by the brackets 58 in the adjacent shaft sector. Adjacent grass sectors will therefore be swept in each 45° of rotation of the shaft while alternate sectors are swept simultaneously.

In operation, the shaft 46 of the raker assembly 16 is rotated by the motor 18 and the drive assembly 20. The handle 32 is raised to rotate the housing 12 about shaft 13 to cause the fingers 54 to engage the lawn to a desired degree. The brackets 48 are rotated together with shaft 46 to successively move the fingers 54 through the lawn along a swath corresponding to the rake width. The direction of rotation of the fingers 54 is indicated by the arrow in FIGURE 2, and with the fingers 54 sufficiently engaged in the lawn during rotation, the rake 10 is pulled forward at the end of the swath, the operator terminates forward movement and by a slight tug operates the rake in reverse along the swath. The fingers lift the raked material to leave it lying on top of the stubble like grass surface in a swath approximately the width of the raker assembly to permit its easy removal.

As the fingers 54 are substantially perpendicular to the plane of the earth during a large portion of their engagement with the grass, any object encountered thereby will strike the finger at an angle substantially perpendicular to longitudinal axis of the finger. This permits the fingers 54 to yield easily without displacing the object or imparting much force thereto and will also avoid excessive finger breakage. The fingers 54 being engaged in this position will also yield easily to aid in preventing the excessive uprooting of grass. The displacement of the fingers about the periphery of shaft 46 also aids in preventing the excessive uprooting of grass while attaining an extremely clean sweeping action or raking action. As a corollary to these functions the amount of power necessary to drive the apparatus is substantially reduced to enable the use of a comparatively small motor on the rake.

It will also be noted that the angle of housing 12 with respect to the yoke 26 may be varied by adjustment of the balance arm 36 so that when the housing 12 is parallel to the earth, the angle of yoke 26 will determine the height of handle 32. This permits the handle height to be easily adjusted in accordance with the operator's needs. In turn, the same adjustment may be used to vary the normal engagement between the fingers and the lawn for any handle height. The engagement between the fingers and lawn of course controls both the raking action and forward movement of the rake. This control may be varied by bearing downwardly or upwardly on the handle 32 to either raise or lower the fingers 54 and control their engagement with the lawn.

The two wheels 14 used to support the rake permit great maneuverability since they may simply be swivelled to avoid obstacles or change course. If it is desired to transport the rake 10 with the housing 12 in a fixed position, the arm 36 is simply lifted and retracted to bring the offset 38 between arm 37 and bracket 34. The arm 36 is dropped into the notch 37a in arm 37 with the offset 38 between the arm 37 and bracket 34. This leaves the housing 12 locked in position so that it is easily transported.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. A power operated lawn rake comprising a housing, a shaft rotatably supported in said housing and having a plurality of flat faces, a plurality of brackets each having a flat face for engaging one of said shaft faces and having an ear transverse to said flat face for engagement against an ear of another bracket whose flat face is engaged against another shaft face, a plurality of raking means, each comprising a coiled spring, and fastening means passing through each pair of engaged ears and engaging a coiled spring for connecting a coiled spring to said engaged ears of said brackets.

2. In the rake claimed in claim 1, an elongate raking finger formed on each spring and extending substantially parallel to the longitudinal axis of the coiled spring.

3. A power operated lawn rake comprising a housing, a shaft rotatably supported in said housing, a pair of wheels for supporting said shaft upon the earth, collapsible handle sections pivotally mounted on said shaft, a bracket carried on said sections, a spring-biased crank supported on said housing and said bracket for altering the position of said housing with respect to an axis perpendicular to the plane of the earth to achieve a desired balanced position, said bracket adapted to engage the earth for supporting said handle sections thereabove responsive to the manual release of said sections, a second shaft rotatably supported in said housing, a hexagonal formation on said second shaft, means for rotating said second shaft, a plurality of brackets each having three sides corresponding to three sides of said hexagonal formation whereby respective pairs of said brackets are placed in engagement about said hexagonal portion in adjacent positions, an apertured ear at opposite ends of said brackets with the ears of each pair lying on radial lines spaced 60° from a radial line passing through the ears of another pair, threaded fastening means adapted to be inserted in opposite directions through respective ears on each radial line, a coiled spring engaging each fastening means to secure said brackets in position, and an extended finger integrally formed on each coiled spring and projecting substantially parallel to the longitudinal axis of the respective spring.

4. A power operated lawn raker comprising a housing, a shaft rotatably supported in said housing, means for rotating said shaft, a hexagonal formation on said shaft, a plurality of brackets each having three sides corresponding to three sides of said hexagonal formation whereby respective pairs of said brackets are adapted to be placed in facing engagement about said hexagonal portion with respective pairs of said brackets in adjacent positions on said portion, and means comprising a coiled spring for fastening a respective pair of brackets in position about said hexagonal formation and having a finger extending parallel to the longitudinal axis of said coiled spring for raking said lawn.

5. The rake claimed in claim 4 in which the longitudinal axis of each spring intersects a radial line from said shaft, and the longitudinal axis of each adjacent spring intersects a radial line spaced 60° from the radial line intersecting another axis.

6. A power operated lawn rake comprising a housing, shaft means rotatably supported in said housing and having a plurality of flat faces thereon, a plurality of brackets each having a flat face for engaging and cooperating with a flat face on said shaft, said brackets each having an ear extending transverse to said flat face on said bracket for engagement against an adjacent ear of another bracket whose flat face is engaged against another flat face on said shaft, raking means affixed to said brackets, said raking means each comprising a coiled spring, and fastening means engaging said coiled spring for connecting a coiled spring to the adjacent ears of said brackets.

7. A power operated lawn rake comprising a housing, shaft means rotatably supported in said housing and having a plurality of flat faces thereon, a plurality of brackets each having a flat face for engaging and cooperating with a flat face on said shaft, said brackets each having an apertured ear extending transverse to said flat face on said bracket for engagement against an apertured adjacent ear of another bracket whose flat face is engaged against another flat face on said shaft, raking means affixed to said brackets, said raking means each comprising a coiled spring, and fastening means engaging said coiled spring for connecting a coiled spring to the adjacent ears of said brackets, said fastening means comprising screw means extending through the adjacent apertured ears and into said coiled spring for engagement therewith, the interior of said coiled spring functioning as a nut.

References Cited in the file of this patent

UNITED STATES PATENTS

| | | |
|---|---|---|
| 397,155 | Tusk | Feb. 5, 1889 |
| 1,297,907 | Rand | Mar. 18, 1919 |
| 2,476,183 | Fergason | July 12, 1949 |
| 2,552,382 | Root | May 8, 1951 |
| 2,645,987 | Brooks | July 21, 1953 |
| 2,661,584 | Ronning | Dec. 8, 1953 |
| 2,987,866 | Ferris | June 13, 1961 |
| 2,989,833 | De Fino | June 27, 1961 |
| 3,024,587 | Warnke | Mar. 13, 1962 |